Sept. 11, 1928.   1,684,158
C. O. STROM ET AL
RUBBER STRIP CUTTING MACHINE
Filed March 14, 1927   4 Sheets-Sheet 1
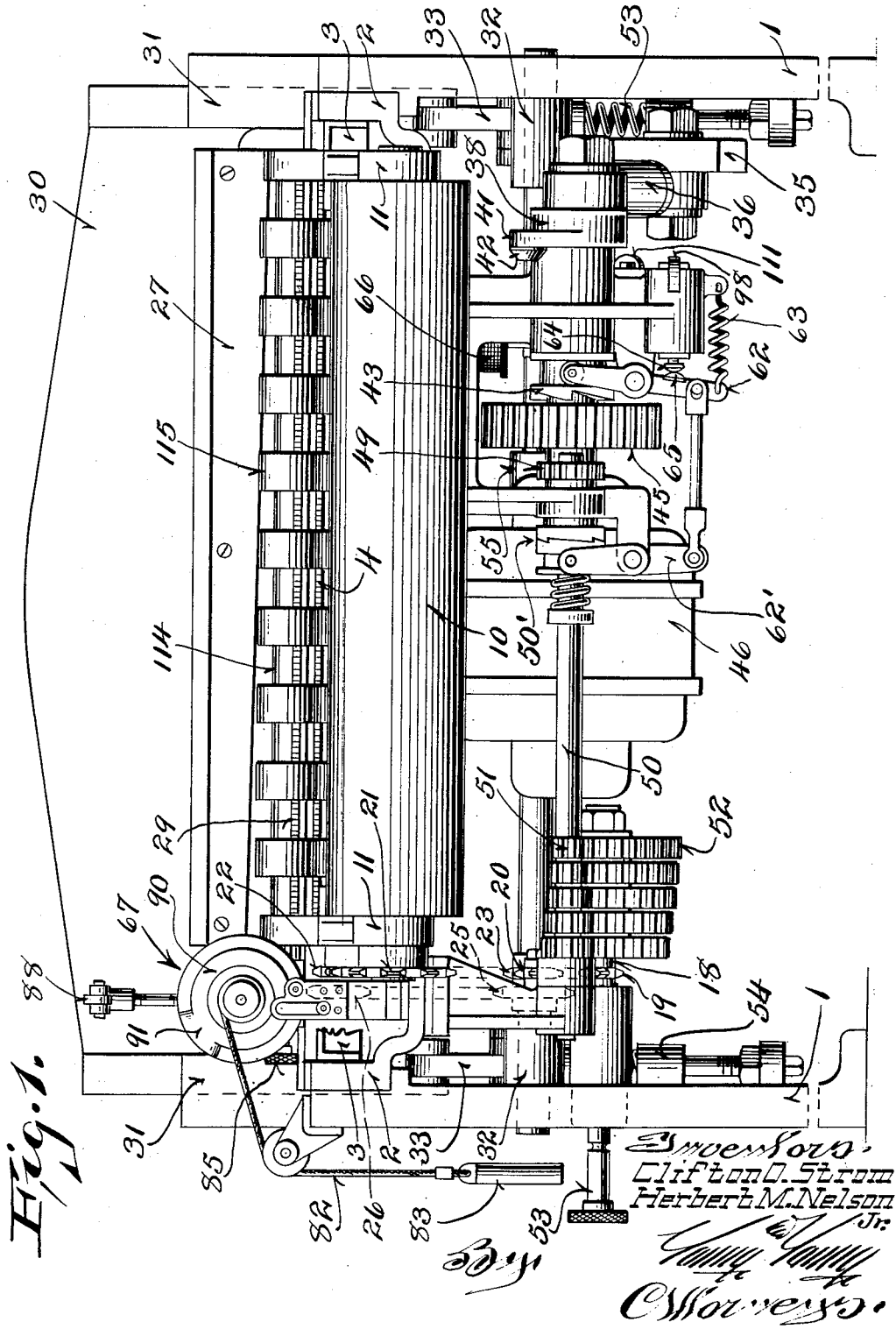

Sept. 11, 1928.
C. O. STROM ET AL
1,684,158
RUBBER STRIP CUTTING MACHINE
Filed March 14, 1927
4 Sheets-Sheet 2
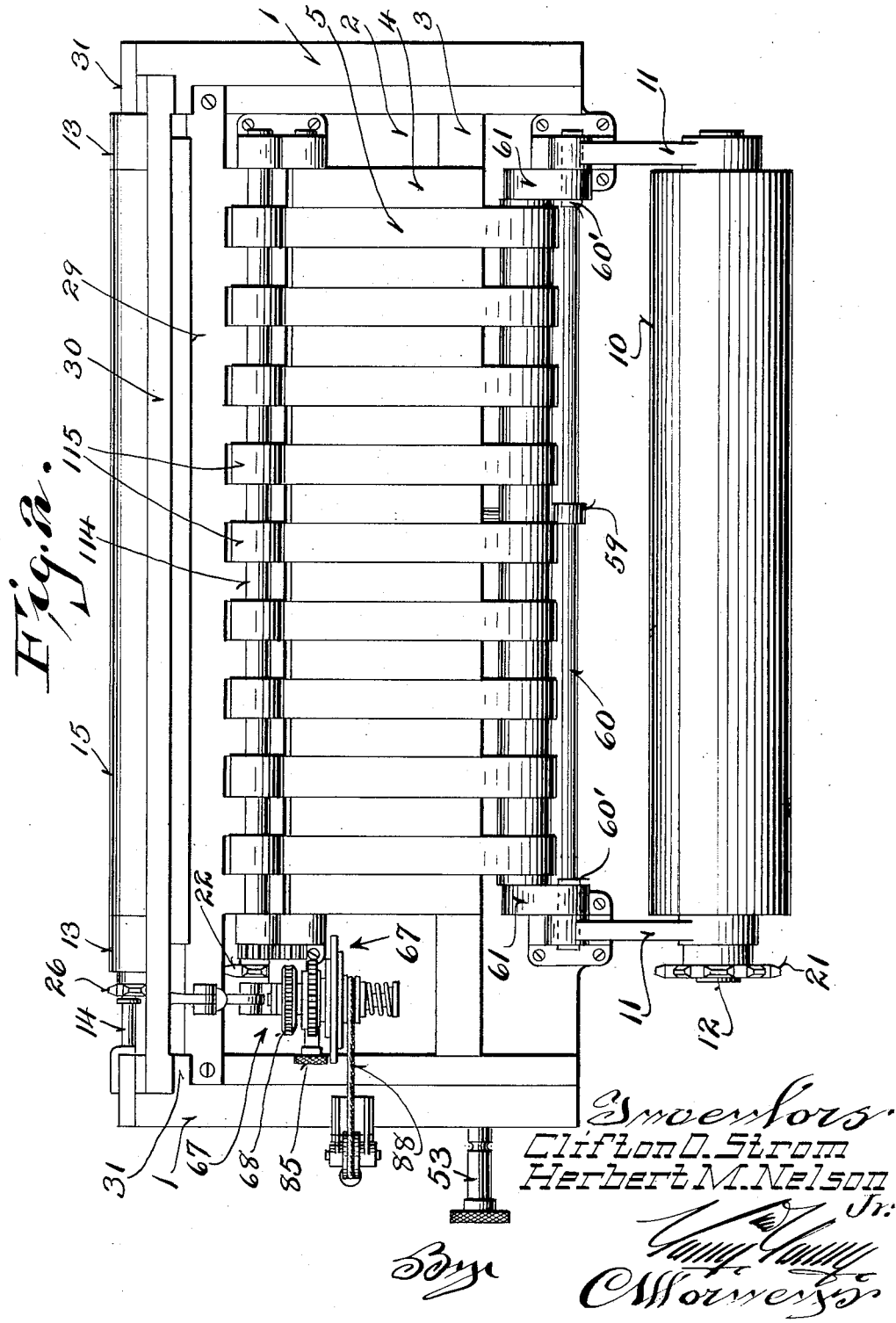
Inventors
Clifton O. Strom
Herbert M. Nelson

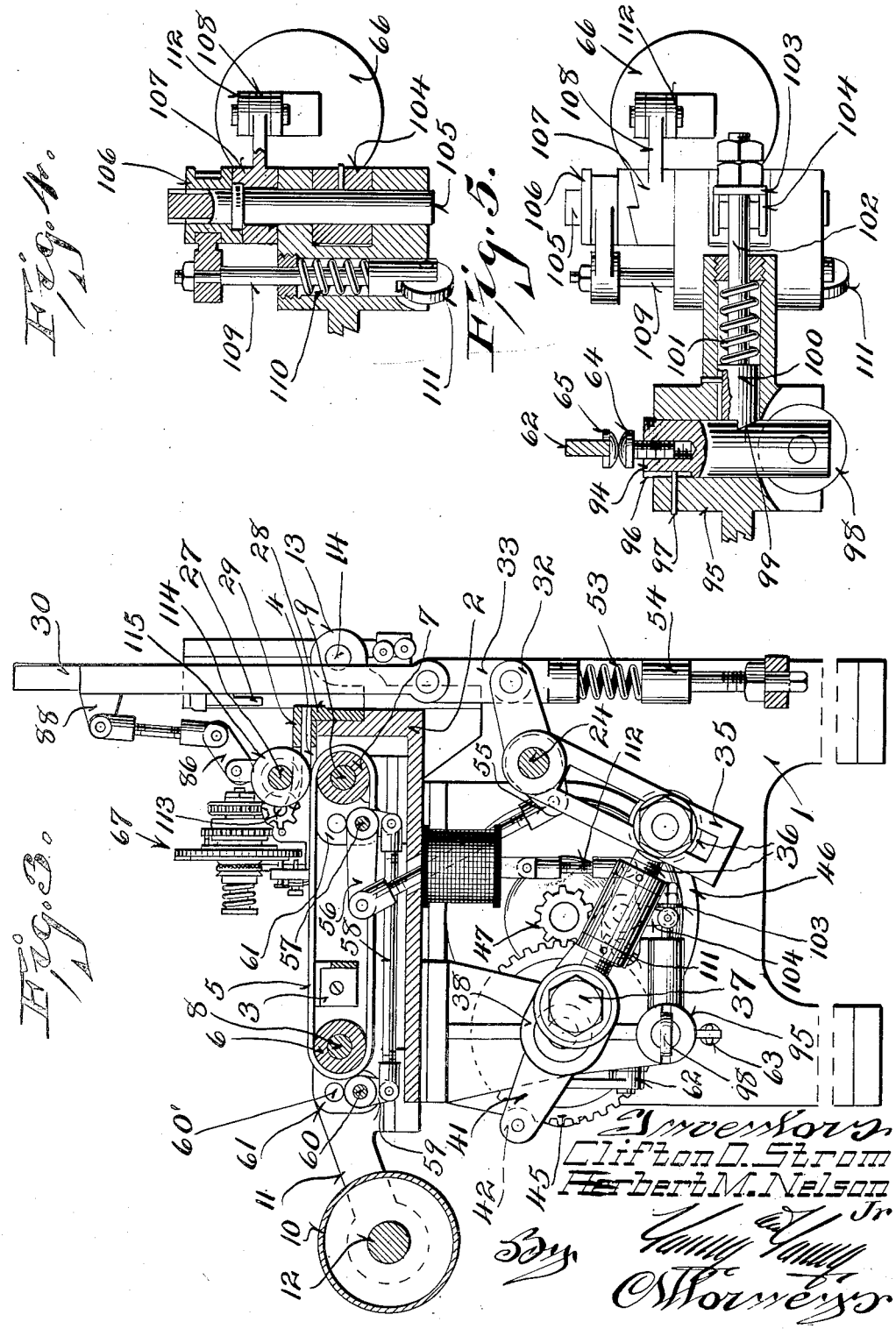

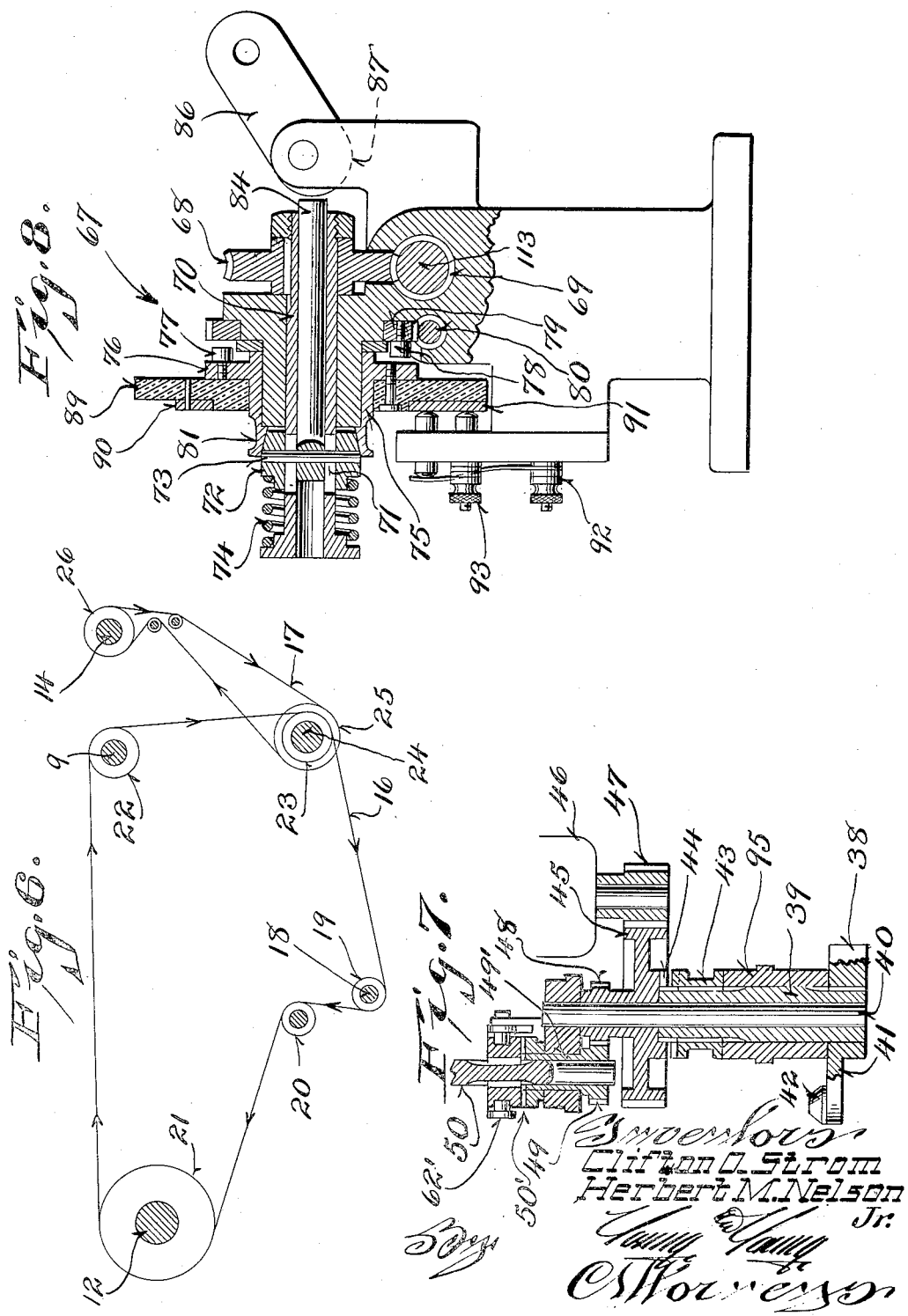

Patented Sept. 11, 1928.

1,684,158

UNITED STATES PATENT OFFICE.

CLIFTON O. STROM AND HERBERT M. NELSON, JR., OF RACINE, WISCONSIN, ASSIGNORS TO NELSON BROS. AND STROM, OF RACINE, WISCONSIN.

RUBBER-STRIP-CUTTING MACHINE.

Application filed March 14, 1927. Serial No. 175,125.

This invention relates to a machine for cutting sheets of material into any desired predetermined lengths, and is particularly directed to a rubber strip cutting machine.

In order to avoid needless repetition, the invention will be described as particularly directed to the cutting of the rubber stock although it is to be understood that the invention is not to be limited by this mode of describing it.

Objects of this invention are to provide a machine which will cut rubber strips into any desired length at a point in the process immediately following the operation of the calender or tubing machine, so that the continuous strip or sheet of rubber is fed directly from the calender or tubing machine to the cutting machine, and means are provided for carrying the severed strips from the cutting machine at a higher rate of speed than the travel of the sheet of stock material so that such cut strips may be delivered in an orderly manner into the press room or other suitable part of the factory.

When it is considered that the material which this machine is adapted to handle and cut is of an easily deformed type, it is to be appreciated that the usual modes of controlling sheet material by means of stops against which the material strikes, or by passing the material between contact actuating members, is unserviceable and inoperative where the material as described above.

This invention, however, is designed to overcome the defects noted above which result from the distortion of the strip and its failure to operate the devices, and objects of such invention are to provide a novel form of strip cutting machine which is adapted to operate upon easily deformed flexible and yielding stock, and which is so constructed that the exact width or length of the strips may be maintained throughout the operation of the machine.

Further objects are to provide a novel form of cutting machine in which the operation of the machine is wholly automatic, in which the sheet of easily deformed material is received directly from other machines and is fed through the cutting machine at such rate as to harmonize with the rate at which the strip is produced so that no accumulation of material or stretching of the sheet can occur, and to provide such a machine as described above which will cause a temporary and substantially instantaneous cessation of the feed of the material at the time it is severed so that curling of the edges of the material against the shear knife or blade can not occur.

Further objects are to provide a novel form of rubber strip cutting machine which is so constructed that the machine is controlled directly by the easily deformed and flexible sheet, and to so construct the machine that a timer or recorder actuated directly by the travel of the material itself automatically controls the machine and is, in turn, automatically reset by the machine.

Further objects are to provide a novel form of rubber strip cutting machine which is provided with feeding mechanism and a shear knife and with connecting parts to throw the feeding mechanism out of operative engagement with the material when the shear knife operates, and which immediately restores the feeding after the shear knife has been retracted.

Further objects are to provide a rubber strip cutting machine in which the clutches for effecting the mechanical coupling and uncoupling of the several parts are positive in their action, although initially controlled by means of a recorder actuated directly by the travel of the material itself.

More specifically, objects of this invention are to provide a machine in which an easily driven register controlled directly by the material itself, in turn controls an electromagnetic device which trips a positive mechanical clutch, and which is itself reset by the operation of the mechanism controlled from the clutch, and to so organize the mechanism that all of the parts are again set at their initial position at the completion of a cycle of operations.

Further objects are to provide a rubber strip cutting machine which, although possessing the characteristics described above is, nevertheless, relatively simple, and is of reliable and sturdy construction.

An embodiment of the invention is shown in the accompanying drawings in which:

Figure 1 is a rear view of the machine;
Figure 2 is a plan view of the machine;
Figure 3 is a transverse sectional view;
Figure 4 is a sectional detail of the solenoid controlling mechanism;

Figure 5 is a side elevation of the structure shown in Figure 4 with the cam trip shown in section;

Figure 6 is a diagrammatic view of the sprocket chain drive;

Figure 7 is a sectional view through the crank shaft clutch;

Figure 8 is a sectional view through the register or timer.

The machine comprises a pair of side frame members 1 which support the entire body of the machine. These side frame members are joined by an L-shaped body portion or bed plate 2, as may be seen most clearly from Figure 3. This bed plate supports a transversely extending angle iron 3 (see Figures 2 and 3) and together the bed plate and angle iron carry a plurality of spaced longitudinally extending supporting fingers 4 shown most clearly in Figure 2. Between these fingers 4, a plurality of feeding belts 5 are adapted to operate. The belts are carried by rollers or pulleys 6 and 7, as shown in Figure 3, which are in turn carried by shafts 8 and 9. It is to be noted that the machine is provided with a spaced drum 10 carried by outwardly projecting arms 11 and rigidly attached to a shaft 12. Further, it is to be noted that a pair of forwardly projecting arms 13 carry a transverse forward shaft 14 which is provided with a drum 15, as may be seen from Figure 2.

The drive for these shafts is indicated in Figure 6 from which it will be seen that the shafts are connected by means of sprocket chains 16 and 17. The main drive for these shafts is obtained from the shaft 18 which will be described hereinafter, and it will be seen that the sprocket chain 16 passes over a sprocket wheel 19 on such shaft, over an idler 20, and over sprocket wheels 21 and 22 carried respectively by the shafts 12 and 9. Further, it will be seen that the sprocket chain 16 passes over a sprocket wheel 23. This sprocket wheel is rigidly connected to a larger sprocket wheel 25 over which the chain 17 passes. The sprocket wheels 23 and 25 loosely rotate upon the rock shaft 24 hereinafter described. This chain also passes over a sprocket wheel 26 carried by the shaft 14. It will be seen that due to the difference in size of the sprocket wheels 25 and 23, that the chain 17 travels at a higher rate of speed than the chain 16 and, consequently as the sprocket wheels 22 and 26 are of the same size the shaft 14 is rotated at a higher rate of speed than the shaft 9.

The incoming sheet or strip of uncured rubber passes over a belt (not shown) carried by the drum 10 and passes to the belts 5, and is fed outwardly below the shear knife 27 (see Figures 1 and 3) and over the shear bar 28 (see Figure 3). From this point, the cut material passes to a belt (not shown) carried by the drum 15 on the shaft 14, and as such belt travels at a higher speed, the cut material is immediately separated and spaced apart and delivered to other portions of the factory, for example, the press room.

It is to be noted from Figures 2 and 3 that a stripping plate 29 provided with stripping fingers is positioned immediately above the shear bar or stationary cutter bar 28 and that the material is fed between these members as is apparent from an examination of Figure 3.

The mechanism for guiding and operating the shear knife 28 will now be described. This mechanism consists of a cross head 30 (see Figures 1 and 3) which is guided by the guides 31 carried by the side frame members 1. The cross head is reciprocated by means of levers 32 (see Figure 3) which are connected to the cross head by means of links 33. The levers 32 are rigidly carried by a rock shaft 24 which also rigidly carries a slotted arm or lever 35, as shown in Figure 3. This lever 35 adjustably carries a pitman or link 36, and it is to be noted that this link is itself adjustable in length. The other end of the link is connected to the crank pin 37 of a crank 38. Attention is directed to Figures 1, 3, and 7, in connection with this crank. It is to be noted particularly from Figure 7, that the crank is rigidly keyed to a sleeve 39 which is loosely carried by a stub shaft 40. Further, it is to be noted that the crank is provided with a projecting arm 41 equipped with a cam disc or member 42 and spaced from such crank. Further, it will be noted from Figure 7 that the sleeve 39 has slidably splined thereto the movable element 43 of a clutch. This movable element cooperates with the clutch teeth 44 formed on a continuously rotating gear 45. The gear 45 is driven continuously from the motor 46 by means of a pinion 47, as most clearly shown in Figure 7.

It will be seen, therefore, from the mechanism thus far described, that when the movable member 43 of the clutch is shifted and locked to the gear 45 that the crank is caused to rotate and consequently the shear bar is made to reciprocate.

In connection with Figure 7, it is to be noted that the gear 45 is rigidly connected to a small pinion 48 which meshes with a pinion 49 carried by the sleeve 49' on the shaft 50. The sleeve 49' is connected by means of a clutch, indicated generally at 50', to the shaft 50. The clutch 50' is controlled by a lever 62' connected to a lever 62 hereinafter described, so that when the movable member 43 is in clutch open position, the clutch 50' will be closed. Attention is now directed to Figure 1. The shaft 50 is coupled by means of a variable speed transmission to the shaft 18 previously mentioned in connection with the drive illustrated in Figure 6, so that the speed of feed of the various drums and rollers may be altered as desired to exactly accord with the speed at which the uncured sheet of rubber is furnished from the calender or other machine from which it is received. This variable speed transmission may be of the conventional type consisting of a plurality of different sized pinions 51 rigidly carried by the shaft 50 and meshing with a plurality of different sized gears 52, any one of which may be locked to the shaft 18 by means of the shifting rod 53. This particular type of variable speed transmission forms no part of the invention, and may therefore be of the conventional type. All that is needed is that a definite predetermined ratio may be established between the shafts 50 and 18 so that the exact speed of feed may be selected.

Returning now to Figure 3, it is to be noted that the cross head is returned by means of springs 55 which are positioned between the lower ends of the links 33 and adjustable spring supports 54 so that the exact compression of these springs may be regulated. Further, it is to be noted that the rock shaft 24 carries a small crank 55 which is connected by means of an adjustable link with a lever 56 carried by a transverse shaft 57. This lever 56 is a bell crank lever and the other arm thereof is connected by means of a pitman 58 with a similar arm or lever 59 carried by a transverse shaft 60 paralleling the shaft 57. The shafts 57 and 60 are rigidly carried by the bell cranks 61 which are pivotally mounted, as indicated at 60'. These bell cranks carry the shafts 8 and 9 of the rollers 6 and 7. In other words, the bell cranks 61 and the levers 59 and 56 constitute rigid structures which move as a unit about the pivot points 60'. Consequently, when the cross head moves downwardly the drums 6 and 7 are depressed and the belts 5 are moved out of contact with the underside of the sheet of uncured rubber and thus cause a cessation in the feeding motion of the rubber at the time that the cutting actually takes place. Obviously, when the cross head rises, the belts are again raised into contact with the underside of the rubber and the material is thus fed forwardly to its next position.

It is to be noted that the crank 38 when operatively connected to the main gear 45 (see Figure 7) rapidly rotates and consequently the cutter knife makes a quick downward stroke and immediately rises and the feeding again starts.

It is to be noted from Figure 1 that the shiftable member 43 of the clutch is controlled by means of a lever 62 which is urged by means of the spring 63 towards clutch closing position. The motion of this lever 62 is restrained by means of the head 64 which contacts with a head 65 formed on the lever 62.

The mechanism for controlling the movable element 43 of the clutch and, consequently, for controlling the stroke of the cutter knife will now be described. This control is through the medium of an electromagnet or solenoid 66 which, in turn, is controlled by means of a timer or register indicated generally by the reference character 67 (see Figures 1, 2, 3, and 8). The details of the register are most clearly shown in Figure 8. This timing mechanism or registering mechanism consists of a worm wheel 68 which is driven by means of a worm 69 hereinafter described. The worm wheel 68 is rigidly keyed to a sleeve 70 which is provided with a projecting end equipped with a slot 71. A friction head 72 of conical contour is connected to the sleeve 70 by means of a transverse pin 73. The friction head is held inwardly by means of a spring 74 and normally contacts with a friction sleeve 75 which rigidly carries a disc 76. The disc 76 is provided with a stop 77 which initially engages the stop 78 carried by an adjustable ring gear 79. The ring gear 79 is adjusted by means of the worm 80 so that the point at which the disc 76 starts may be varied. It is to be noted that the sleeve 75 is provided with a drum-like outer surface 81 around which a rope or cable 82 (see Figure 1) is wrapped, such cable being held in a taut condition by means of the weight 83. The sleeve 70 slidably carries a shaft 84 which is rigidly connected to the pin 73 and, consequently, controls the frictional coupling between the head 72 and the sleeve 75. Thus, when the shaft 84 is pressed inwardly, the connection is interrupted and the disc 76 is allowed to move under the influence of the weight 83 back to its initial position with the stops 78 and 77 contacting. The position at which these stops will contact, or in other words, the position of the stop 78 is adjusted through the medium of the worm 80 such worm 80 being operated by a knurled hand wheel 85 (see Figures 1 and 2) so that the device may be set to start at any desired point. The means for interrupting the operative connection between the worm driven sleeve 70 and the disc 76 consists of a lever 86 provided with a cam shaft 87 adapted to contact with the end of the shaft 84. This lever 86 is connected by means of an adjustable pitman with a projecting ear 88 (see Figure 3) carried by the cross head 30 so that when the cross head descends, the operative connection between the worm 68 and the disc 76 is interrupted and the disc is allowed to move back to its initial position.

The disc 76 rigidly carries an insulating disc 89 which carries a contact ring 90 provided with a projecting portion 91 (see Figures 1 and 8). The ring 90 is in electrical contact at all times with the binding post 92, and the projecting ear 91 moves into electrical contact with the binding post 93, such binding post being provided with suitable brushes, as indicated in Figure 8. The binding posts are connected in the circuit of the solenoid 66 and, consequently control the energization of the solenoid. With the parts shown in the position of Figure 8, the circuit of the solenoid would be closed and, consequently, the main clutch for operating the crank would be closed in a manner hereinafter described. However, when the cross head descends, the disc 89 moves back to its initial position, as previously described, and the circuit of the solenoid is consequently opened.

When it is considered that the crank when connected to the rapidly travelling gear 45 might execute several complete rotations, it is to be appreciated that means must be provided for mechanically interrupting the connection of the crank at a definite point in its cycle so that only one reciprocation of the cross head can occur. This means will now be described and is illustrated particularly in Figures 3, 4, and 5, attention being also directed to Figure 1 which shows the control lever 62 for the movable element of the clutch.

As previously described, the control lever is held in inoperative position with the clutch open by the contacting of the heads 64 and 65. The head 64 is adjustably carried by means of a plunger 94 slidably mounted in a bearing 95 carried from the bed plate or body portion 2 of the machine, as shown in Figure 3. This plunger is prevented from rotating in any suitable manner, as by means of the slot 96 which cooperates with the pin 97. The plunger is provided with a roller 98 at its outer end for a purpose hereinafter to appear and is provided with a notch 99 into which the pointed end of a locking plunger 100 normally fits, such locking plunger being carried within a suitable bearing and held against turning in the same manner, as previously described. This locking plunger 100 is urged inwardly by means of the spring 101 and is carried by means of the rod 102. The rod 102 is provided with an adjustable washer 103 which bears against the arms of a lever 104 so that when the lever 104 moves outwardly it withdraws the latch 100 and allows the plunger 94 to move inwardly and thus allows the closing of the clutch. The lever 104 is rigidly attached to the short shaft 105 (see Figure 4). The shaft 105 is slidably splined to a clutch member 106 which cooperates with the hub 107 of a lever 108 loosely mounted upon the shaft 105. This clutch member and the hub, as shown in Figure 5, are provided with interlocking teeth so that a positive connection is normally maintained therebetween. The position of the clutch member is controlled by means of the rod 109 which is held in its inward position, normally by means of the spring 110. The outer end of the rod 109 is provided with a roller 111 for a purpose hereinafter to appear. The lever 108 is connected to the plunger of the solenoid by means of an adjustable link 112, as shown in Figure 3 so that when the solenoid is actuated the link is drawn upwardly and the levers 108 and 104 rocked to withdraw the latch 100 and allow the plunger 94 to move inwardly. This permits the lever 62 (see Figure 1) to rock into clutch closing position and, consequently, the crank starts to rotate. The rotation of the crank carries the arm 41 (see Figures 3 and 7) and this arm, as previously described, is provided with the cam-shaped projecting portion 42. The cam-shaped projecting portion travels in the path of the rollers 111 and 98. When the crank has executed approximately one-half of its stroke, the roller 111 is engaged and, consequently, the operative connection between the levers 108 and 104 (see Figures 3, 4, and 5), is interrupted. However, the latch 100 merely slides inwardly and does not enter the notch 99 as the plunger 94 which controls the clutch has moved out of position. Continued rotation of the crank brings the arm 41 into a position where its cam member 42 engages the roller 98 of the plunger 94 and consequently resets the plunger and opens the clutch mechanically. It is to be noted that the crank is now past dead center and the springs 53 thus come into play and shove the cross head upwardly and also restore the crank to its initial position, as shown in Figure 3.

It will be seen, therefore, that the solenoid is controlled by the register and in turn initiates the closing of the clutch. This main clutch when closed causes the partial rotation of the crank and the reciprocation of the cross head. The mechanism described immediately above causes the resetting of the solenoid controlled mechanism and also of the register and, in addition, causes the crank to return under the action of the springs 53 (see Figure 3) to its initial position. Also, as described immediately above, the clutch is opened and locked in open position.

The means for operating the register will now be described and will conclude the description of this machine. This means is directly controlled or actuated by the actual travel of the material itself, so that the register accurately gauges the exact length of travel of the material and, consequently, the utmost accuracy in the cutting of the material may be obtained. The register, as described in connection with Figure 8, is driven by the worm 69. This worm is carried by the worm shaft 113 which as may be seen from Figure 3, is provided with a small pinion meshing with a pinion carried by the transverse shaft 114. The transverse shaft 114, as may be seen from Figures 2 and 3 is provided with a plurality of regularly spaced rollers 115. These rollers engage the upper side of the uncured rubber sheet at a multitude of places and, consequently, do not distort the sheet in any manner. They do not impose an appreciable load upon the travel of the sheet and also uniformly engage the sheet, as descibed above. The only effort required of the shaft 114 which carries these rollers is the free rotation of the worm 69 which, in turn, drives the worm wheel 68. Thus, there is a very small load imposed upon this shaft and, consequently, it can be easily driven by the material itself.

A brief résumé of the operation will now be given. The exact feed desired for the material is selected so that the uncured rubber sheet as it comes from the calender or other machine is received and fed by this cutting machine at the same speed. This rubber sheet passes over the parallel feed belts 5 and travels over the fingers or strips 4 which are positioned between the belts so that when the belts are moved downwardly out of engagement with the underside of the sheet, such sheet is evenly supported by the strips 4. When the requisite length of sheet has passed, as indicated by the register 67, the circuit of the solenoid is closed and the clutch is closed. The shear knife then quickly makes a cutting stroke and returns to its initial position. At the same time, the register is reset and the operative connection between the solenoid controlled mechanism is first broken and then reestablished after the solenoid circuit has been opened. Also the clutch is open during the last part of the motion of the cutter blade and the parts are thus brought back to their initial position. The feed which was stopped by the lowering of the belts 5 is now again established by moving the belts upwardly in an automatic manner, as previously described. There is, therefore, only an instantaneous cessation of the feed of the material while the cutting takes place. Consequently, this cutting machine will cooperate directly with the machine delivering the sheet or strip of uncured rubber and also will cut the rubber into the desired lengths with the utmost accuracy. It frequently happens that some other machine is driven from the cutting machine. For instance, it is sometimes desirable to drive a member for stripping the canvas, ordinarily used with the stock rubber sheet, from the rubber. This stripping means is thus caused to stop functioning when the clutch 50' is open and gives a better cooperative action between the machines.

Although the invention has been described in considerable detail, such description is intended as illustrative rather than limiting as the invention may be variously embodied and as the scope of such invention is to be determined as claimed.

We claim:

1. In a machine for cutting a sheet of material into lengths, the combination of feeding means, cutting means, and registering means driven directly by the material while it is being fed for controlling the cutting means and the feeding means, said registering means including an automatically reset registering member and an adjustable stop for controlling the starting point to which the registering member is automatically reset, whereby the machine may be set to cut sheets of any predetermined length.

2. In a machine for cutting a sheet into predetermined lengths, the combination of a shear head having a shear bar, feeding means for advancing the sheet, automatic means adapted to be moved from an initial position for controlling the initiation of the stroke of the shear head, means for reciprocating said head, mechanism operated by said shear head for moving the control means back to its initial position, and spring means for returning said shear head.

3. In a machine for cutting a sheet of material into predetermined lengths, the combination of a shear head having a shear bar, a feeding belt for feeding the work to the shear bar and mounted for movement into and out of contact with the sheet, and automatic means controlling the actuation of the shear head and the position of the belts.

4. In a machine for cutting a sheet of material into predetermined lengths, the combination of a shear head having a shear bar, a feeding belt for feeding the work to the shear bar and mounted for movement into and out of contact with the sheet, and automatic registering means operated directly by the sheet while it is being fed and controlling the actuation of the shear head and the position of the belts.

5. In a machine for cutting an easily deformed flexible sheet into predetermined lengths, the combination of a plurality of spaced feeding belts mounted upon movable rollers and adapted to engage the underside of the material, a plurality of supporting fingers mounted between the belts and adapted to support the material when the belts are depressed, a transverse shaft extending across the upper side of the material and having means for engaging the material at a multitude of points, easily driven registering means operated from said shaft, electrical means operated from said registering means and controlling the position of the belts, and a shear bar controlled by said electrical means.

6. In a machine for cutting an easily deformed flexible sheet of material into predetermined lengths, the combination of a plurality of belts arranged in spaced relation for engaging the underside of the material, mechanical means for depressing said belts out of engagement with the material, a plurality of fingers positioned between said belts for supporting the sheet of material when the belts are depressed, a shear bar extending across the sheet of material, mechanical means for reciprocating said shear bar including a clutch, a registering device having a transversely extending shaft positioned above the material and having means thereon engaging the material at a multitude of points, said registering means having a contact member operated from said shaft by reduced gearing, and a solenoid controlled by the contact member and controlling the depression of the belts and the closing of the said clutch.

In testimony that we claim the foregoing we have hereunto set our hands at Racine, in the county of Racine and State of Wisconsin.

CLIFTON O. STROM.
HERBERT M. NELSON, Jr.